(12) United States Patent
Yoshida (10) Patent No.: US 12,502,913 B2
(45) Date of Patent: Dec. 23, 2025

(54) TIRE

(71) Applicant: The Yokohama Rubber Co., LTD., Tokyo (JP)

(72) Inventor: Hiroyuki Yoshida, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 293 days.

(21) Appl. No.: 17/758,330

(22) PCT Filed: Jan. 8, 2021

(86) PCT No.: PCT/JP2021/000561
§ 371 (c)(1),
(2) Date: Jul. 1, 2022

(87) PCT Pub. No.: WO2021/141123
PCT Pub. Date: Jul. 15, 2021

(65) Prior Publication Data
US 2023/0044588 A1    Feb. 9, 2023

(30) Foreign Application Priority Data

Jan. 9, 2020    (JP) .................................. 2020-002327

(51) Int. Cl.
*B60C 11/01*     (2006.01)
*B60C 13/02*     (2006.01)

(52) U.S. Cl.
CPC .............. *B60C 11/01* (2013.01); *B60C 13/02* (2013.01); *B60C 2200/14* (2013.01)

(58) Field of Classification Search
CPC .................................. B60C 13/02; B60C 11/01
See application file for complete search history.

(56) References Cited

U.S. PATENT DOCUMENTS

| | | | | |
|---|---|---|---|---|
| 2019/0299719 A1* | 10/2019 | Murata | .................. | B60C 13/02 |
| 2020/0055346 A1* | 2/2020 | Murata | .................. | B60C 13/02 |
| 2020/0070593 A1* | 3/2020 | Mori | ..................... | B60C 13/002 |

FOREIGN PATENT DOCUMENTS

| | | | | |
|---|---|---|---|---|
| JP | 2017-124733 A | 7/2017 | | |
| JP | 2017-213925 A | 12/2017 | | |
| JP | 2018-001942 A | 1/2018 | | |
| JP | 2018-016202 A | 2/2018 | | |
| JP | 2018-114811 A | 7/2018 | | |
| JP | 2019-055702 A | 4/2019 | | |
| JP | 2019-111967 A | 7/2019 | | |
| JP | 2019-142362 A | 8/2019 | | |
| WO | WO-2018135485 A1 * | 7/2018 | ............ | B60C 11/01 |

* cited by examiner

*Primary Examiner* — Justin R Fischer
*Assistant Examiner* — Nicholas J Weiler
(74) *Attorney, Agent, or Firm* — Thorpe North & Western (57) ABSTRACT

Provided is a tire. At least one of sidewall portions includes a plurality of side blocks rising from a surface of the at least one of sidewall portions and a plurality of side grooves defined by the side blocks adjacent to each other in a tire circumferential direction, one end of the plurality of side grooves opening to an inner side in a tire radial direction. A land ratio of an area of a region of the side blocks to an area of a region defined by a first imaginary line along a ridge, which is a mold split position, and a second imaginary line along an individual leading edge portion on the inner side of a plurality of the side blocks in the tire radial direction is in a range 40%≤R1≤80%.

11 Claims, 8 Drawing Sheets

|  | CONVENTIONAL EXAMPLE | COMPARATIVE EXAMPLE 1 | EXAMPLE 1 | EXAMPLE 2 | EXAMPLE 3 | EXAMPLE 4 | EXAMPLE 5 | COMPARATIVE EXAMPLE 2 | COMPARATIVE EXAMPLE 3 | EXAMPLE 6 | EXAMPLE 7 |
|---|---|---|---|---|---|---|---|---|---|---|---|
| LAND RATIO R1 (%) | 90 | 35 | 48 | 50 | 60 | 70 | 80 | 90 | 50 | 63 | 70 |
| OUTER CIRCUMFERENCE LAND RATIO R2 (%) | 100 | 80 | 80 | 80 | 80 | 80 | 88 | 80 | 60 | 70 | 75 |
| INNER CIRCUMFERENCE LAND RATIO R3 (%) | 50 | 55 | 55 | 55 | 55 | 55 | 55 | 55 | 48 | 55 | 55 |
| R3/R2 | 0.5 | 0.7 | 0.7 | 0.7 | 0.7 | 0.7 | 0.6 | 0.7 | 0.8 | 0.8 | 0.7 |
| R2/R1 | 1.1 | 2.3 | 1.7 | 1.6 | 1.3 | 1.1 | 1.1 | 0.9 | 1.2 | 1.1 | 1.1 |
| HEIGHT OF SIDE BLOCK | 3 | 5 | 5 | 5 | 5 | 5 | 5 | 5 | 5 | 5 | 5 |
| A/SH | 0.1 | 0.3 | 0.3 | 0.3 | 0.3 | 0.3 | 0.3 | 0.3 | 0.3 | 0.3 | 0.3 |
| TRAVELING PROPERTIES ON MUD ROAD | 100 | 103 | 105 | 106 | 108 | 110 | 109 | 112 | 103 | 108 | 109 |
| TRAVELING PROPERTIES ON ROCKY ROAD SURFACE | 100 | 103 | 103 | 103 | 105 | 108 | 108 | 106 | 103 | 105 | 106 |
| SCRATCH RESISTANCE | 100 | 105 | 105 | 106 | 108 | 110 | 115 | 112 | 105 | 108 | 109 |
| UNIFORMITY | 100 | 99 | 110 | 108 | 107 | 107 | 103 | 105 | 103 | 107 | 107 |

FIG. 7A

| | COMPARATIVE EXAMPLE 4 | COMPARATIVE EXAMPLE 5 | EXAMPLE 8 | EXAMPLE 9 | COMPARATIVE EXAMPLE 6 | COMPARATIVE EXAMPLE 7 | COMPARATIVE EXAMPLE 10 | EXAMPLE 11 | COMPARATIVE EXAMPLE 8 | COMPARATIVE EXAMPLE 9 | COMPARATIVE EXAMPLE 12 |
|---|---|---|---|---|---|---|---|---|---|---|---|
| LAND RATIO R1 (%) | 70 | 70 | 70 | 70 | 70 | 70 | 70 | 70 | 70 | 70 | 70 |
| OUTER CIRCUMFERENCE LAND RATIO R2 (%) | 95 | 80 | 80 | 80 | 80 | 90 | 90 | 80 | 84 | 80 | 80 |
| INNER CIRCUMFERENCE LAND RATIO R3 (%) | 55 | 30 | 40 | 57 | 80 | 36 | 45 | 64 | 75 | 55 | 55 |
| R3/R2 | 0.6 | 0.4 | 0.5 | 0.7 | 1.0 | 0.4 | 0.5 | 0.8 | 0.9 | 0.7 | 0.7 |
| R2/R1 | 1.4 | 1.1 | 1.1 | 1.1 | 1.1 | 1.3 | 1.3 | 1.1 | 1.2 | 1.0 | 1.1 |
| HEIGHT OF SIDE BLOCK | 5 | 5 | 5 | 5 | 5 | 5 | 5 | 5 | 5 | 5 | 5 |
| A/SH | 0.3 | 0.3 | 0.3 | 0.3 | 0.3 | 0.3 | 0.3 | 0.3 | 0.3 | 0.3 | 0.3 |
| TRAVELING PROPERTIES ON MUD ROAD | 110 | 108 | 106 | 108 | 109 | 105 | 109 | 108 | 108 | 109 | 108 |
| TRAVELING PROPERTIES ON ROCKY ROAD SURFACE | 108 | 107 | 105 | 107 | 109 | 104 | 110 | 107 | 107 | 107 | 107 |
| SCRATCH RESISTANCE | 112 | 110 | 105 | 106 | 108 | 103 | 107 | 106 | 106 | 107 | 107 |
| UNIFORMITY | 103 | 104 | 104 | 104 | 103 | 105 | 105 | 104 | 104 | 104 | 104 |

FIG. 7B

| | EXAMPLE 13 | COMPARATIVE EXAMPLE 10 | COMPARATIVE EXAMPLE 11 | EXAMPLE 14 | EXAMPLE 15 | COMPARATIVE EXAMPLE 12 | COMPARATIVE EXAMPLE 13 | COMPARATIVE EXAMPLE 16 | EXAMPLE 17 | COMPARATIVE EXAMPLE 14 |
|---|---|---|---|---|---|---|---|---|---|---|
| LAND RATIO R1 (%) | 53 | 50 | 70 | 70 | 70 | 70 | 70 | 70 | 70 | 70 |
| OUTER CIRCUMFERENCE LAND RATIO R2 (%) | 90 | 90 | 80 | 80 | 80 | 80 | 80 | 80 | 80 | 80 |
| INNER CIRCUMFERENCE LAND RATIO R3 (%) | 55 | 55 | 55 | 55 | 55 | 55 | 55 | 55 | 55 | 55 |
| R3/R2 | 0.6 | 0.6 | 0.7 | 0.7 | 0.7 | 0.7 | 0.7 | 0.7 | 0.7 | 0.7 |
| R2/R1 | 1.7 | 1.8 | 1.1 | 1.1 | 1.1 | 1.1 | 1.1 | 1.1 | 1.1 | 1.1 |
| HEIGHT OF SIDE BLOCK | 5 | 5 | 2 | 3 | 10 | 11 | 5 | 5 | 5 | 5 |
| A/SH | 0.3 | 0.3 | 0.3 | 0.3 | 0.3 | 0.3 | 0.05 | 0.1 | 0.4 | 0.5 |
| TRAVELING PROPERTIES ON MUD ROAD | 109 | 109 | 104 | 106 | 115 | 115 | 105 | 108 | 115 | 115 |
| TRAVELING PROPERTIES ON ROCKY ROAD SURFACE | 108 | 108 | 103 | 105 | 112 | 112 | 102 | 105 | 112 | 112 |
| SCRATCH RESISTANCE | 107 | 106 | 101 | 103 | 118 | 118 | 108 | 111 | 118 | 118 |
| UNIFORMITY | 104 | 103 | 105 | 104 | 102 | 99 | 105 | 104 | 104 | 102 |

FIG. 7C

TIRE

TECHNICAL FIELD

The present technology relates to a tire and particularly relates to a tire suitable for driving on unpaved roads.

BACKGROUND ART

For a tire mounted on a vehicle typically traveling on unpaved roads such as a muddy ground, a sandy ground, and a rocky ground surface (e.g., a pickup truck), ensuring off-road performance and scratch resistance and achieving an aggressive appearance are awaited. Accordingly, a known pneumatic tire has adopted side blocks having high design properties in a sidewall portion (see, for example, Japan Unexamined Patent Publication No. 2018-1942).

Some side blocks with high design properties give a stereoscopic effect of the sidewall portion with different heights of the blocks, and such side blocks tend to have a big difference in unevenness between the side blocks. This lowers the tire uniformity due to the gauge variation in a tire circumferential direction, and vibration during traveling is likely to occur.

SUMMARY

The present technology provides a pneumatic tire that provides off-road performance and scratch resistance in a compatible manner while suppressing a decrease in uniformity.

A tire according to an embodiment of the present technology includes a tread portion extending in a tire circumferential direction, a pair of sidewall portions respectively disposed on both sides of the tread portion. At least one of the sidewall portions includes a plurality of side blocks rising from a surface of the at least one of sidewall portions and a plurality of side grooves defined by the side blocks adjacent to each other in the tire circumferential direction, one end of each of the plurality of side grooves opening to an inner side in a tire radial direction. When a first imaginary line along a mold split position, which is a boundary between a tread mold forming the tread portion and a side mold forming the side blocks and the sidewall portions, and a secondary imaginary line along an individual end portion on the inner side of a plurality of the side blocks in the tire radial direction are defined, a land ratio R1 of a region defined by the first imaginary line and the second imaginary line to regions of the side blocks is in the range $40\% \leq R1 \leq 80\%$.

In the tire described above, a third imaginary line is defined along intermediate positions between the first imaginary line and the second imaginary line at a vertical distance in the tire radial direction, and an outer circumference land ratio R2 of an outer circumferential region defined by the first imaginary line and the third imaginary line to regions of the side blocks in the outer circumferential region is preferably in the range $65\% \leq R2 \leq 90\%$.

In the tire described above, the third imaginary line along the intermediate positions between the first imaginary line and the second imaginary line at the vertical distance in the tire radial direction is defined, and an inner circumference land ratio R3 of an inner circumferential region defined by the second imaginary line and the third imaginary line to regions of the side blocks in the inner circumferential region is preferably in the range $35\% \leq R3 \leq 70\%$.

In the tire described above, a relationship between the inner circumference land ratio R3 and the outer circumference land ratio R2 is preferably in the range $0.5 \leq (R3/R2) \leq 0.8$.

In the tire described above, a relationship between the outer circumference land ratio R2 and the land ratio R1 is preferably in the range $0.5 \leq (R2/R1) \leq 0.8$.

In the tire described above, preferably, a shoulder region of the tread portion includes a plurality of shoulder blocks arranged in the tire circumferential direction, and the side blocks are disposed straddling at least two shoulder blocks adjacent to each other in the tire circumferential direction.

In the tire described above, preferably, the side blocks each include a recess portion in a substantially central portion in the tire circumferential direction and a shallow groove that is connected to the recess portion and is shallower than the recess portion, and the shallow groove extends to the inner side in the tire radial direction and opens to the side groove.

In the tire described above, the side blocks preferably have a projection amount of 3 mm or more and 10 mm or less from the surfaces of the sidewall portions.

In the tire described above, a relationship between a vertical distance A from the mold split position to an individual end portion on the inner side in the tire radial direction in the side blocks and a tire cross-sectional height SH is preferably in the range $0.1 \leq (A/SH) \leq 0.4$.

In the tire according to an embodiment of the present technology, the land ratio R1 of the region defined by the first imaginary line along the mold split position and the second imaginary line along each end portion on the inner side of the plurality of side blocks in the tire radial direction to the regions of the side blocks is in the range $40\% \leq R1 \leq 80\%$. This allows for providing off-road performance and scratch resistance in a compatible manner while suppressing a decrease in tire uniformity.

DETAILED DESCRIPTION

Tires according to embodiments of the present technology will be described in detail below with reference to the drawings. A tire according to the present embodiment is a pneumatic tire for a vehicle traveling on unpaved roads such as a muddy ground, a sandy ground, and a rocky ground surface, such as a pickup truck. However, the present technology is not limited to the embodiment. Constituents of the following embodiments include elements that can be substituted and easily conceived of by a person skilled in the art or that are essentially identical.

Figure 1:
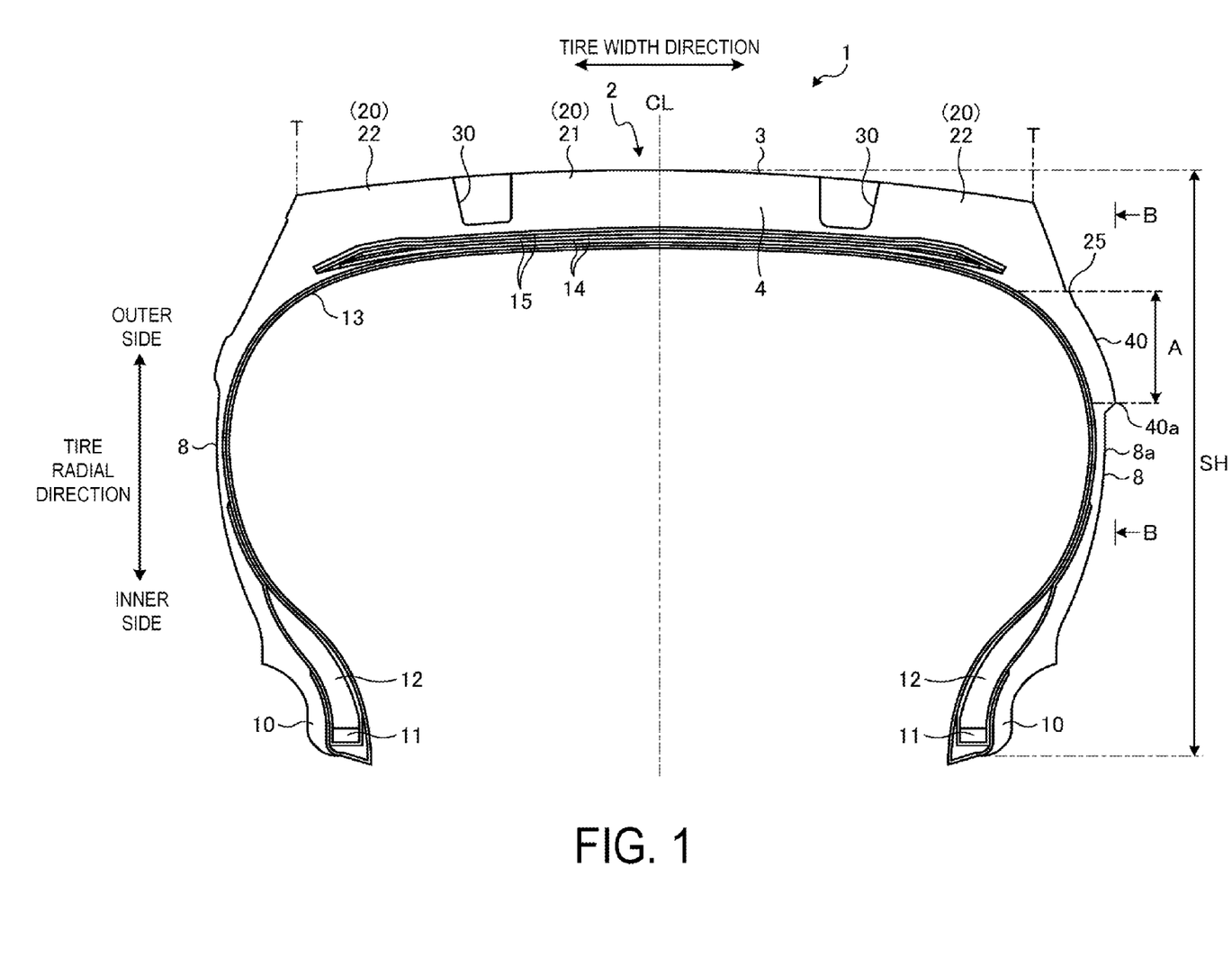
FIG. 1 is a meridian cross-sectional view illustrating a main portion of a pneumatic tire according to the present embodiment.
Figure 2:
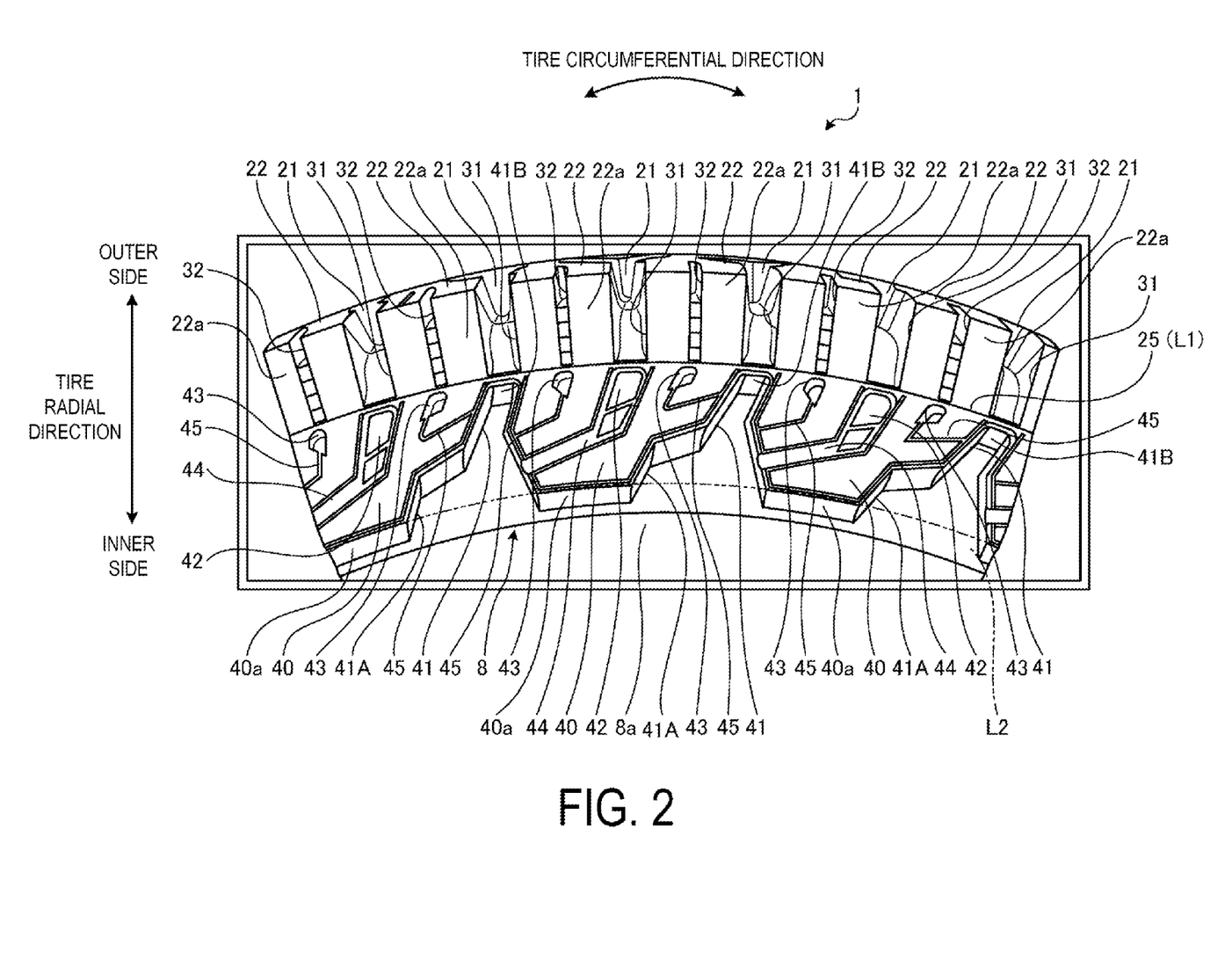
FIG. 2 is a view taken along line B-B in the direction of arrows of FIG. 1.
Figure 3:
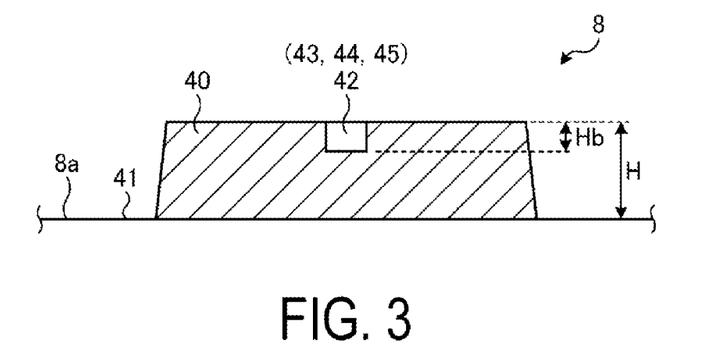
FIG. 3 is a cross-sectional view schematically illustrating a side block.

FIG. 1 is a meridian cross-sectional view illustrating a main portion of a pneumatic tire according to the present embodiment. FIG. 2 is a view taken along line B-B in the direction of arrows of FIG. 1. FIG. 3 is a cross-sectional view schematically illustrating a side block. Hereinafter, the tire radial direction refers to a direction orthogonal to a rotation axis (not illustrated) of a pneumatic tire 1. The inner side in the tire radial direction refers to a side toward the rotation axis in the tire radial direction, and the outer side in the tire radial direction refers to a side away from the rotation axis in the tire radial direction. The tire circumferential direction refers to a circumferential direction about the rotation axis as a central axis. The tire width direction refers to a direction parallel to the tire rotation axis. The inner side in the tire width direction refers to a side toward a tire equatorial plane CL in the tire width direction, and the outer side in the tire width direction refers to a side away from the tire equatorial plane CL in the tire width direction.

As illustrated in FIG. 1, a pneumatic tire 1 includes a tread portion 2 disposed on a portion on an outermost side in the tire radial direction, and the tread portion 2 includes a tread rubber layer 4 formed of a rubber composition. A surface of the tread portion 2, which is a portion that contacts a road surface during traveling of a vehicle (not illustrated) with the pneumatic tires 1 mounted, is formed as a road contact surface 3 and forms a portion of a contour of the pneumatic tire 1.

A pair of sidewall portions 8 each extending to the inner side in the tire radial direction is disposed on both sides of the tread portion 2 in the tire width direction. The side portions 8 each include a pair of bead portions 10 in the inner side in the tire radial direction. The bead portions 10 each include a bead core 11, and a bead filler 12 is provided in the outer side of the bead core 11 in the tire radial direction. The bead core 11 is an annular member formed by bundling bead wires, which are steel wires, and the bead filler 12 is a rubber member disposed in the outer side of the bead core 11 in the tire radial direction.

The tread portion 2 includes a plurality of belt layers 14 (two layers in FIG. 1). The belt layers 14 include a plurality of reinforcing cords that are inclined with respect to the tire circumferential direction, the reinforcing cords intersecting with each other between the layers. The inclination angle of each of the reinforcing cords with respect to the tire circumferential direction is set in a predetermined range (for example, 10° or more and 40° or less). A belt reinforcing layer 15 is disposed on the outer side of the belt layers 14 in the tire radial direction. The belt reinforcing layer 15 includes an organic fiber cord oriented in the tire circumferential direction, and the angle of the organic fiber cord with respect to the tire circumferential direction is set in a predetermined range (for example, 0° or more and 5° or less). A tread rubber layer 4 provided in the tread portion 2 is disposed on the outer side of the belt layers 14 and the belt reinforcing layer 15 in the tire radial direction in the tread portion 2.

In contrast, a carcass layer 13 containing cords of radial plies is continuously provided on the inner side of the belt layers 14 in the tire radial direction and on a tire equatorial plane CL side of the sidewall portions 8. The carcass layer 13 has a single layer structure made of one carcass ply or a multilayer structure made of a plurality of carcass plies, and spans between the pair of bead portions 10 disposed on both sides in the tire width direction in a toroidal shape to form a framework of the tire.

Specifically, the carcass layer 13 is disposed from one to the other of the pair of bead portions 10 located on both sides in the tire width direction and is turned back toward the outer side in the tire width direction along the bead cores 11 at the bead portions 10, wrapping around the bead cores 11 and the bead fillers 12. The bead filler 12 is a rubber member disposed in a space in the outer side of the bead core 11 in the tire radial direction, the space being formed by folding the carcass layer 13 back at the bead portion 10. The belt layer 14 and the belt reinforcing layer 15 are disposed on the outer side of a portion of the carcass layer 13 spanning the pair of bead portions 10 in the tire radial direction, the portion being located in the tread portion 2. The carcass ply of the carcass layer 13 is made by coating, with coating rubber, and rolling a plurality of carcass cords made from steel or an organic fiber material such as aramid, nylon, polyester, or rayon. The plurality of carcass cords forming the carcass ply is disposed in parallel at an angle in the tire circumferential direction, the angle with respect to the tire circumferential direction being along a tire meridian direction.

The tread portion 2 includes a plurality (for example, two) of main grooves 30 extending in the tire circumferential direction on the road surface 3, the plurality of main grooves 30 being arranged in the tire width direction. The plurality of main grooves 30 has, for example, a zigzag shape in which a portion extending linearly in a predetermined direction is connected via a bend point. The inside of each of the main grooves 30 (groove bottom) includes a tread wear indicator (slip sign, not illustrated) for indicating terminal stages of wear. A plurality (for example, three rows) of land portions defined by a plurality of the main grooves 30 is further defined into a plurality of blocks 20 by various grooves (such as a lug groove, an auxiliary groove, and a narrow groove, not illustrated). Accordingly, the tread portion 2 forms a block pattern based on the blocks 20.

In an example of FIG. 1, the plurality of blocks 20 includes a center block 21 defined between a pair of the main grooves 30 and shoulder blocks 22 defined on the outer side in the tire width direction (shoulder region) of the pair of main grooves 30. The center block 21 is defined by center lug grooves connecting the pair of the main grooves 30 and extending in the tire width direction and auxiliary grooves connecting the center lug grooves adjacent to each other in the tire circumferential direction. The shoulder block 22 is defined by shoulder lug grooves 31 (FIG. 2) extending from the main groove 30 beyond a ground contact edge E, and a plurality of the shoulder blocks 22 is arranged in the tire circumferential direction. In an example of FIG. 2, the shoulder block 22 includes a narrow groove 32 on the ground contact surface (road contact surface 3) of the shoulder block 22 and on a side surface 22a on the outer side in the tire width direction.

The ground contact edges T here refers to both outermost edges of a region contacting a flat plate on the road contact surface 3 in the tire width direction when the pneumatic tire 1 is mounted on a specified rim, inflated to a specified internal pressure, placed perpendicular to the flat plate in a stationary state, and loaded with a load corresponding to a specified load and continues in the tire circumferential direction. The specified rim refers to a "standard rim" defined by JATMA (The Japan Automobile Tyre Manufacturers Association, Inc.), a "Design Rim" defined by TRA (The Tire and Rim Association, Inc.), or a "Measuring Rim"

defined by ETRTO (The European Tyre and Rim Technical Organisation). Moreover, the specified internal pressure refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. The specified load refers to a "maximum load capacity" defined by JATMA, a maximum value in "TIRE LOAD LIMITS AT VARIOUS COLD INFLATION PRESSURES" defined by TRA, or a "LOAD CAPACITY" defined by ETRTO.

As illustrated in FIG. 2, the sidewall portion 8 includes a plurality of side blocks 40 in the tire circumferential direction. The side blocks 40 are formed rising from a surface 8a of the sidewall portion 8, and a side groove 41 is formed between the side blocks 40 and 40 adjacent to each other in the tire circumferential direction defined by the side blocks 40. That is, the side block 40 and the side groove 41 are paired and repeatedly disposed in the sidewall portion 8 in the tire circumferential direction. As illustrated in FIG. 1, the side block 40 is a portion located on an outermost side in the tire width direction and has traction performance by catching mud or the like on road surfaces during traveling on unpaved roads. As illustrated in FIG. 1, the side blocks 40 are thus provided on at least one of the pair of sidewall portions 8 (for example, one located outside a vehicle when mounted on the vehicle) but, needless to say, may be provided on both of the pair of sidewall portions 8.

The plurality of side blocks 40 is disposed adjacent to a plurality of shoulder blocks 22 on the outer side of the sidewall portion 8 in the tire radial direction. In the present embodiment, a ridge 25 extending in a rib shape in the tire circumferential direction is formed between the plurality of side blocks 40 and the plurality of shoulder blocks 22. The ridge 25 corresponds to a mold split position. The mold split position is defined as a boundary position between a tread mold (not illustrated) that forms the tread portion 2 and a side mold (not illustrated) that forms the sidewall portion 8 and the side blocks 40. The ridge 25 (mold split position) can be visually recognized, in the pneumatic tire 1, as a mark made by the tread mold moving in the tire radial direction and the side mold moving in the tire width direction pressing against each other.

The side block 40 has a polygonal shape (heptagonal shape) having seven vertices including a vertex that projects toward an inner side of the block. The side block 40 includes a base end portion connected to a ridge 25 side and a leading edge portion (end portion) 40a extending to the inner side in the tire radial direction. The side block 40 is tapered inward in the tire radial direction, that is, narrower on a leading edge portion 40a side in the tire circumferential direction than on a base end portion side. Note that the shape of the side block 40 is not limited to a heptagon.

Also, as illustrated in FIG. 2, one side block 40 straddles two shoulder blocks 22 and 22 adjacent to each other in the tire circumferential direction. That is, the two shoulder blocks 22 adjacent to each other in the tire circumferential direction form a pair of blocks, and one side block 40 is provided for each of the pair of blocks (so-called 2 in 1 configuration). This configuration improves the rigidity of the side block 40, and thus can improve scratch resistance during traveling on unpaved roads such as a rocky ground surface (rocky road surface). Note that the side block 40, which in the present embodiment straddles the two shoulder blocks 22 adjacent to each other in the tire circumferential direction, may straddle three or more shoulder blocks 22.

The side groove 41 is provided between the side blocks 40 and 40 adjacent to each other and includes one end 41A opening to the inner side in the tire radial direction. The side groove 41 has a shape in which the opening widens toward the inner side in the tire radial direction in a reverse fashion from the shape of the side block 40. The side block 40 is disposed straddling the two shoulder blocks 22 adjacent to each other in the tire circumferential direction, and the other end 41B of the side groove 41 is disposed at a position corresponding to the shoulder lug groove 31 (on an extension of the shoulder lug groove 31) and terminates at the ridge 25 at this position. In the present embodiment, the side groove 41 is located on the extension of the shoulder lug groove 31, and this allows water and mud in the shoulder lug groove 31 to be discharged through the side groove 41, thus improving drainage properties. Note that while the present embodiment has the ridge 25 between the shoulder lug groove 31 and the side groove 41, the shoulder lug groove 31 and the side groove 41 may be connected to each other without the ridge 25.

As illustrated in FIG. 3, the side block 40 is preferably formed at a height (projection amount) H in a range of 3 mm or more and 10 mm or less from the surface 8a of the sidewall portion 8. Here, the height H of the side block 40 being less than 3 mm fails to yield a sufficient edge effect due to an excessively small size of the block. Also, the height of the side block 40 exceeding 10 mm emphasizes the unevenness of the side block 40 (varying amounts of rubber) and degrades tire uniformity. Accordingly, the present embodiment sets the height H of the side block 40 to 5 mm.

Further, as illustrated in FIG. 2, the side blocks 40 each include a first recess portion 42, a second recess portion 43, a shallow groove 44, and a sipe 45. The first recess portion 42 is formed in a substantially central portion of the side block 40 in the tire circumferential direction and on the extension of the shoulder lug groove 31. A plurality (two) of the second recess portions 43 is disposed sandwiching the first recess portion 42 in the tire circumferential direction and is formed on an extension of the narrow groove 32 of the shoulder block 22. The shallow groove 44 communicates the first recess portion 42 with the side groove 41 and includes one end connected to the first recess portion 42 and the other end extending to the inner side in the tire radial direction and opening to the side groove 41. The sipe 45 communicates the second recess portion 43 with the side groove 41 and includes one end connected to the second recess portion 43 and the other end extending to the inner side in the tire circumferential direction and in the tire radial direction and opening to the side groove 41 on a side closer to the second recess portion 43.

The first recess portion 42, the second recess portion 43, the shallow groove 44, and the sipe 45 that are formed in the side block 40 are each set to have a depth Hb, which is equal to or less than the height H of the side block 40. Specifically, the first recess portion 42 has, for example, a depth equivalent to the height H of the side block 40. The second recess portion 43 and the shallow groove 44, while deeper than a predetermined reference value (0.2H), are shallower than the first recess portion 42, and each have a depth, for example, in the range $0.2H \leq Hb < H$ with respect to the height H of the side block 40. The sipe 45 is shallower than the second recess portion 43, the shallow groove 44, and the predetermined reference value (0.2H), and has a depth, for example, in the range $0.2H > Hb$ with respect to the height H of the side block 40.

The first recess portion 42, with its depth equivalent to the height H of the side block 40, can effectively press dirt during traveling on mud roads and increase earth pillar shearing force. Furthermore, with the shallow groove 44, which is shallower than the first recess portion 42, connected to the first recess portion 42, water generated when the first recess portion 42 presses dirt can be effectively discharged to the side groove 41 through the shallow groove 44 during tire rotation. This can improve traveling properties (off-road performance) on mud roads.

Preferably, the pneumatic tire 1 mounted on a vehicle traveling on unpaved roads such as a muddy ground, a sandy ground, and a rocky ground surface ensures off-road performance and scratch resistance, and reduces vibration during traveling by suppressing a decrease in tire uniformity. The side block 40, which is disposed repeatedly at predetermined intervals in the tire circumferential direction in the sidewall portion 8, is a portion largely related to tire uniformity. Thus, the inventors have focused on the land ratio of the side blocks 40 and have identified a numerical range of the land ratio that can properly ensure tire uniformity.

Figure 4:
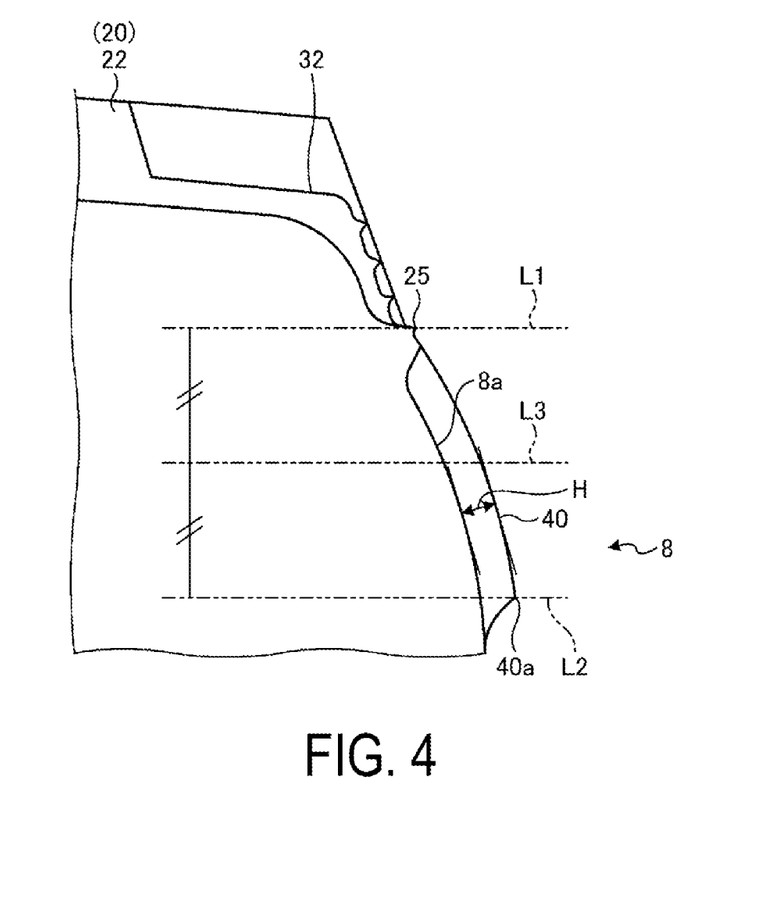
FIG. 4 is a partially enlarged cross-sectional view illustrating the side block.
Figure 5:
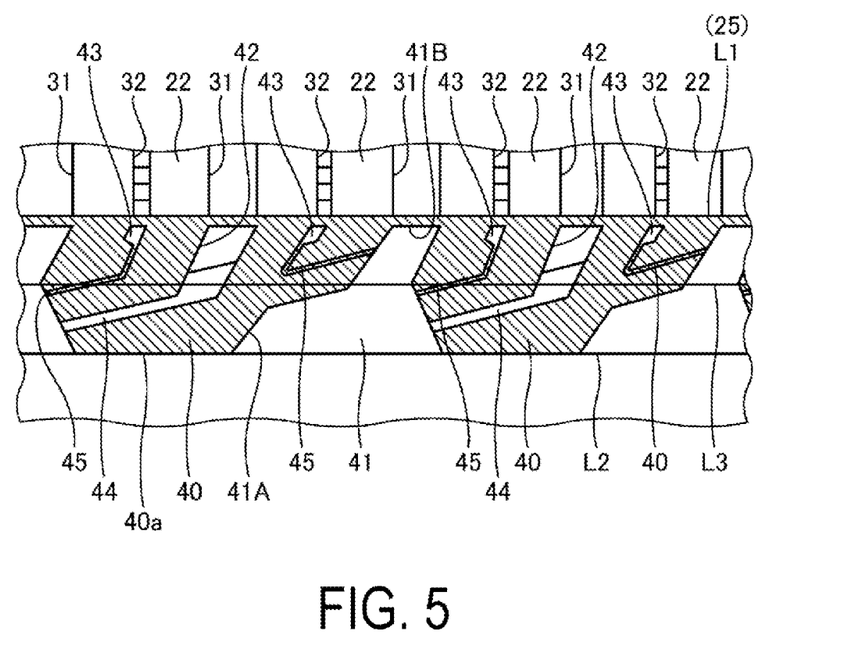
FIG. 5 is a design diagram of the side block.

FIG. 4 is a partially enlarged cross-sectional view illustrating the side block, and FIG. 5 is a design diagram of the side block. For convenience, FIG. 5 represents in a linear shape a plurality of side blocks extending in an annular shape in the tire circumferential direction. First, the land ratio will be described. "Land ratio R1" refers to the proportion of the area of the side blocks relative to the area of a predetermined region. As illustrated in FIGS. 4 and 5, the predetermined region is an annular region defined by a first imaginary line L1 extending along the ridge 25, which is a mold split position, and a second imaginary line L2 extending along the leading edge portions 40a on the inner side of the plurality of side blocks 40 in the tire radial direction. On the other hand, the area of a region of the side blocks 40 is an area obtained by subtracting the areas of the first recess portions 42, the second recess portions 43, and the shallow grooves 44 from the area of all of the side blocks 40. In the present embodiment, a recess portion or a groove having a depth Hb that is less than 20% of the height H of the side block 40 (0.2H) is included in the area of the side block 40. That is, the sipe 45 having a depth Hb in the range 0.2H>Hb is regarded as part of the side block 40.

In this case, the land ratio R1 is in the range 40%≤R1≤80% but is preferably in the range 55%≤R1≤75%. Furthermore, the land ratio R1 is more preferably in the range 50%≤R1≤70%. This configuration can adjust the land ratio R1 of the side blocks 40 and improve high traction performance (off-road performance) and scratch resistance during traveling on unpaved roads. The configuration can also suppress excessive unevenness of the side blocks 40 and thus suppress a decrease (deterioration) in tire uniformity.

That is, in a case where the land ratio R1 is less than 40%, the area of the regions of the side blocks 40 is too small to obtain a sufficient edge effect, and off-road performance and scratch resistance degrade. In a case where the land ratio R1 is larger than 80%, the area of the regions of the side blocks 40 is too large, and thus tire uniformity degrades. The present embodiment, by setting the land ratio R1 in the range 40%≤R1≤80%, can provide off-road performance and scratch resistance in a compatible manner while suppressing a decrease in tire uniformity. Further, setting the land ratio R1 in the range 55%≤R1≤75% or 50%≤R1≤70% can provide higher off-road performance and scratch resistance in a compatible manner while suppressing a decrease in tire uniformity.

As illustrated in FIG. 4, the present embodiment also defines a third imaginary line L3 along intermediate positions of a vertical distance in the tire radial direction between the first imaginary line L1 and the second imaginary line L2, and specifies the ranges of the land ratios of the regions defined by the imaginary lines L1 to L3. Specifically, an outer circumference land ratio R2 of an area of an outer circumferential region defined by the first imaginary line L1 and the third imaginary line L3 to an area of the regions of the side blocks 40 in the outer circumferential region is preferably in the range 65%≤R2≤90%, and more preferably in the range 65%≤R2≤80%.

The outer circumferential region defined by the first imaginary line L1 and the third imaginary line L3 is a region adjacent to the shoulder block 22 and is a region that is more likely to contact a road surface during traveling on a mud road surface or a rocky road surface, for example. In the present embodiment, the outer circumference land ratio R2 on a road contact surface 3 side of the tread portion 2, is higher than the land ratio R1, and this can improve the contact area with the road surface and improve traveling properties on a muddy ground and a rocky ground surface. That is, in a case where the outer circumference land ratio R2 is less than 65%, the area of the regions of the side blocks 40 in the outer circumferential region is too small, decreasing traveling properties on a muddy ground and a rocky ground surface. In a case where the outer circumference land ratio R2 is larger than 90%, the area of the regions of the side blocks 40 in the outer circumferential region is too large, and tire uniformity decreases. The present embodiment, which sets the outer circumference land ratio R2 in the range 65%≤R2≤90%, can provide off-road performance and scratch resistance in a compatible manner, particularly on a muddy ground and a rocky ground surface, while suppressing a decrease in tire uniformity. Furthermore, setting the outer circumference land ratio R2 in the range 65%≤R2≤80% can provide higher off-road performance and scratch resistance in a compatible manner while suppressing a decrease in tire uniformity.

The relationship between the outer circumference land ratio R2 and the land ratio R1 is preferably in the range 1.1≤(R2/R1)≤1.7. This configuration enhances the outer circumference land ratio R2 on the road contact surface 3 side of the tread portion 2 higher than the overall land ratio R1, improving the contact area of the road contact surface and improving traveling properties on a muddy ground and a rocky ground surface. That is, in a case where the relationship between the outer circumference land ratio R2 and the land ratio R1 (R2/R1) is less than 1.1, the area of the regions of the side blocks 40 in the outer circumferential region is too small, decreasing traveling properties on a muddy ground and a rocky ground surface. In a case where the relationship between the outer circumference land ratio R2 and the land ratio R1 is greater than 1.7 (R2/R1), the area of the regions of the side blocks 40 in the outer circumferential region is too large, and thus tire uniformity decreases. The present embodiment, which sets the relationship between the outer circumference land ratio R2 and the land ratio R1 within the range 1.1≤(R2/R1)≤1.7, can provide off-road performance and scratch resistance in a compatible manner, particularly on a muddy ground and a rocky ground surface, while suppressing a decrease in tire uniformity.

Further, the inner circumference land ratio R3 of an area of an inner circumferential region defined by the second imaginary line L2 and the third imaginary line L3 to the area of the regions of the side blocks 40 in the inner circumferential region is preferably in the range 35%≤R3≤70%, and more preferably in the range 40%≤R3≤60%.

In the present embodiment, the inner circumference land ratio R3 on the inner side in the tire radial direction and does not contact road surface is lower than the ratio R1 in all the land. Accordingly, the area of all of the side blocks 40 can be maintained in an optimal range to provide off-road performance and scratch resistance in a compatible manner, and as a result, the gauge variation of the sidewall portion 8 decreases and a decrease in tire uniformity can be suppressed. That is, in a case where the inner circumference land ratio R3 is less than 35%, the area of the regions of the side blocks 40 in the inner circumferential region is too small, and scratch resistance decreases. In a case where the inner circumference land ratio R3 is larger than 70%, the area of the regions of the side blocks 40 is too large, and thus tire uniformity decreases. The present embodiment, which sets the inner circumference land ratio R3 in the range 35%≤R3≤70%, can provide off-road performance and scratch resistance in a compatible manner while suppressing a decrease in tire uniformity. Furthermore, the inner circumference land ratio R3 can be set in the range 40%≤R3≤60% to provide higher off-road performance and scratch resistance in a compatible manner while suppressing a decrease in tire uniformity.

Also, the relationship between the inner circumference land ratio R3 and the outer circumference land ratio R2 is preferably in the range 0.5≤(R3/R2)≤0.8. The present embodiment sets the outer circumference land ratio R2 to a larger value than the inner circumference land ratio R3, and can provide off-road performance and tire uniformity in a compatible manner by varying the inner circumference land ratio R3 and the outer circumference land ratio R2, with the boundary at the middle position of the vertical line in the tire radial direction in the side block 40. That is, in a case where the relationship between the inner circumference land ratio R3 and the outer circumference land ratio R2 (R3/R2) is less than 0.5, the outer circumference land ratio R2 is too large compared to the inner circumference land ratio R3, and thus tire uniformity decreases. In a case where the relationship between the inner circumference land ratio R3 and the outer circumference land ratio R2 is greater than 0.8 (R3/R2), the outer circumference land ratio R2 is too small compared to the inner circumference land ratio R3. Accordingly, the area of the regions of the side blocks 40 in the outer circumferential region is too small, and off-road performance and scratch resistance decrease. The present embodiment, which sets the relationship between the inner circumference land ratio R3 and the outer circumference land ratio R2 in the range 0.5≤(R3/R2)≤0.8, can provide off-road performance and scratch resistance in a compatible manner while suppressing a decrease in tire uniformity.

Also, the side block 40 preferably has a height in the tire radial direction in a range of appropriate values to provide off-road performance, scratch resistance, and tire uniformity in a compatible manner. Specifically, as illustrated in FIG. 1, a vertical distance A from the ridge (mold split position) 25 to the leading edge portion 40a on the inner side of the side block 40 in the tire radial direction is preferably 10% or more and 40% or less of a tire cross-sectional height SH. In other words, the relationship between the vertical distance A and the tire cross-sectional height SH described above is preferably in the range 0.1≤(A/SH)≤0.4. That is, in a case where the relationship (A/SH) of the vertical distance A and the tire cross-sectional height SH is less than 0.1 (10%), the vertical distance A (height) of the side block 40 is not sufficient, and off-road performance and scratch resistance decrease. In a case where the relationship (A/SH) of the vertical distance A and the tire cross-sectional height SH is greater than 0.4 (40%), the side block 40 is too large, and thus tire uniformity decreases due to gauge variation associated with weight increase. The present embodiment, which sets the relationship between the vertical distance A from the ridge 25 to the leading edge portion 40a on the inner side of the side block 40 in the tire radial direction and the tire cross-sectional height SH in the range 0.1≤(A/SH)≤0.4, can provide off-road performance and scratch resistance in a compatible manner while suppressing a decrease in tire uniformity.

Modified Examples

Figure 6:
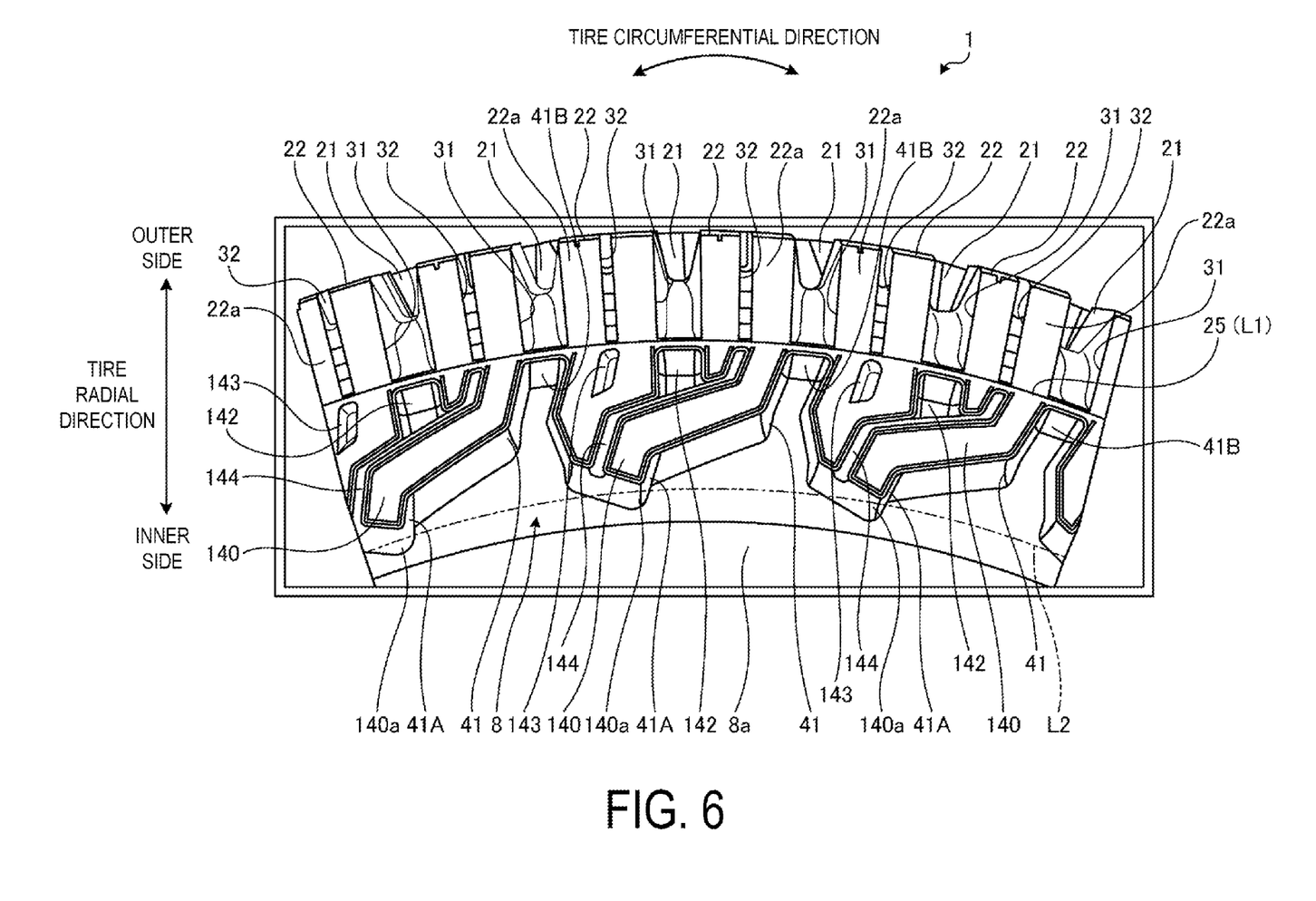
FIG. 6 is a diagram illustrating a modified example of the side block.

Note that as long as the land ratio R1, the outer circumference land ratio R2, and the inner circumference land ratio R3, which are described above, are in the defined ranges, the shape of the side block and the like are not limited to those described in the embodiments. FIG. 6 is a diagram illustrating a modified example of the side block. In FIG. 6, a side block 140 has a polygonal shape (heptagonal shape) having seven vertices including a vertex that projects toward an inner side of the block. The side block 140 includes a base end portion connected to a ridge 25 side and one vertex extending to the inner side in the tire radial direction to form a leading edge portion (end portion) 140a.

As illustrated in FIG. 6, the side block 140 includes a first recess portion (recess) 142, a second recess portion 143, and a shallow groove 144. The first recess portion 142 is located in a substantially central portion of the side block 140 in the tire circumferential direction and on an extension of the shoulder lug groove 31. The second recess portion 143 is disposed next to the first recess portion 142 in the tire circumferential direction and on an extension of the narrow groove 32 of the shoulder block 22. The shallow groove 144 communicates the first recess portion 142 with the side groove 41 and has one end extending to an opposite side of the second recess portion 143 in the tire circumferential direction with the first recess portion 142 interposed and terminating on the extension of the narrow groove 32 of the shoulder block 22. The other end of the shallow groove 144 extends to the inner side in the tire radial direction and opens to the side groove 41. Other configurations are equivalent to those described in the embodiments described above, and thus descriptions thereof are omitted.

Examples

Figure 7A:
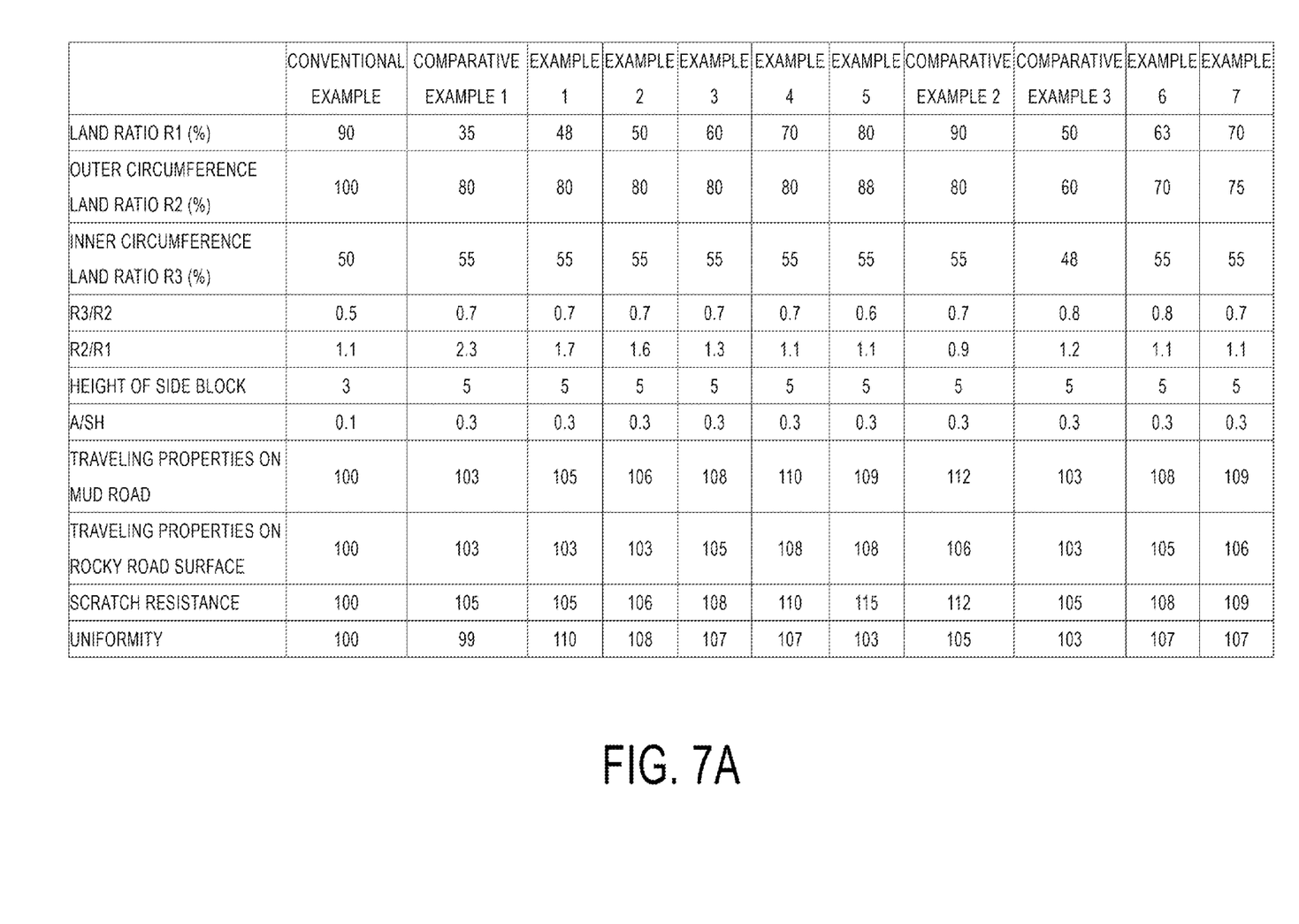
FIG. 7A is a table showing the results of performance evaluation tests of a pneumatic tire.
Figure 7B:
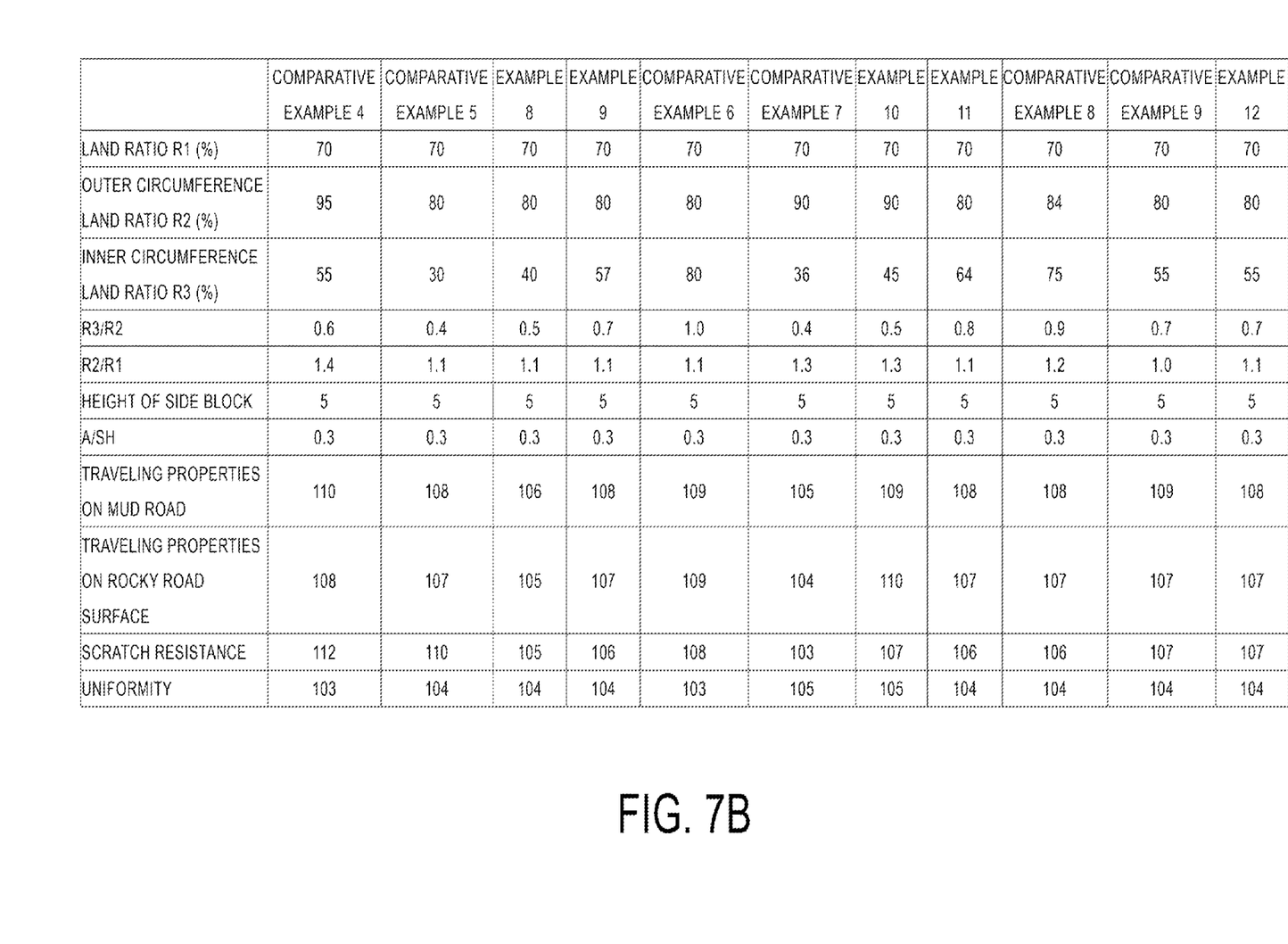
FIG. 7B is a table showing the results of performance evaluation tests of a pneumatic tire.
Figure 7C:
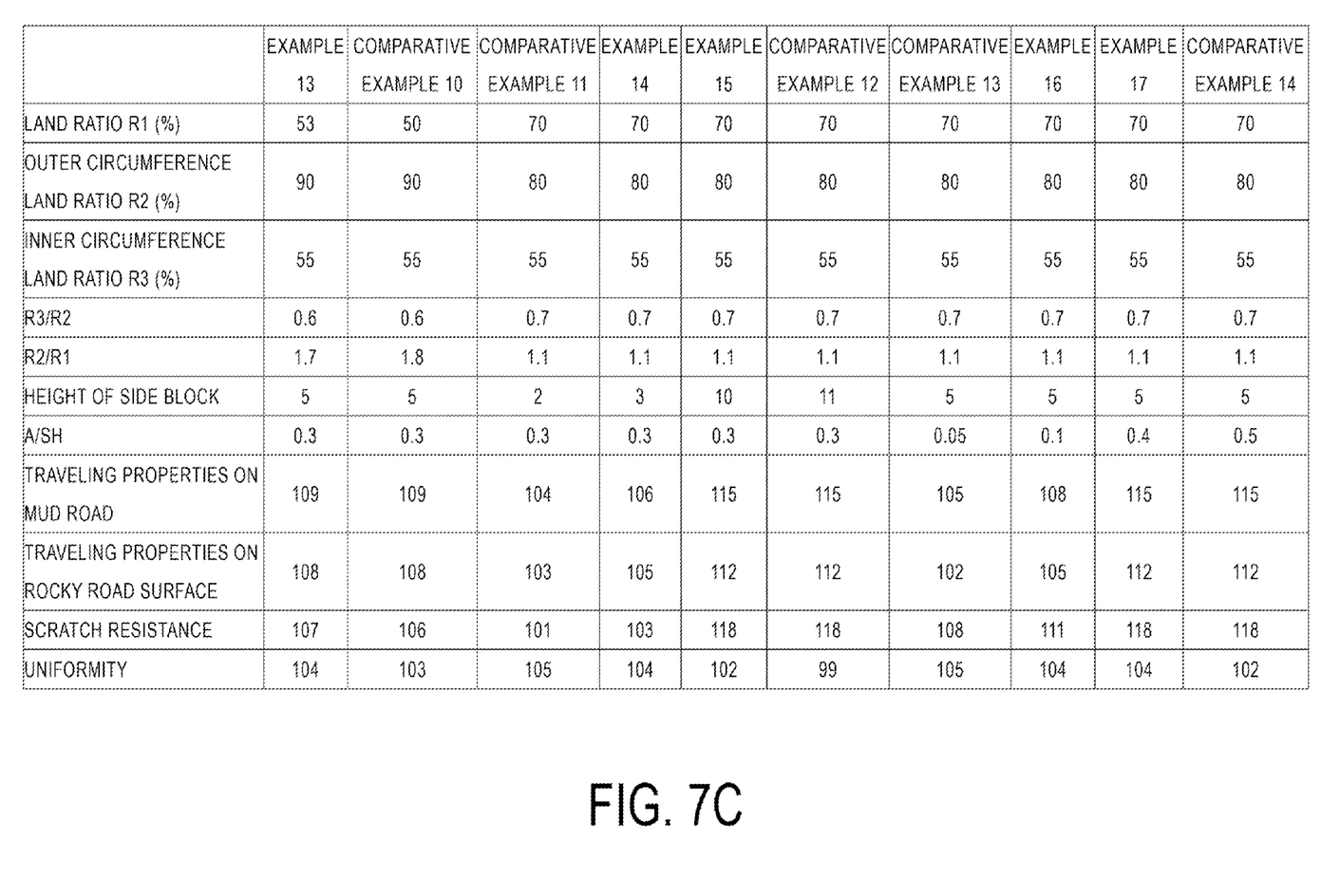
FIG. 7C is a table showing the results of performance evaluation tests of a pneumatic tire.

FIGS. 7A to 7C are tables showing the results of performance evaluation tests of pneumatic tires. Described below are the performance evaluation tests with respect to the pneumatic tire 1 described above, the tests being performed on a pneumatic tire of Conventional Example, pneumatic tires according to Comparative Examples, and the pneumatic tires 1 according to embodiments of the present technology. The performance evaluation tests were conducted to gauge off-road performance, that is, traveling properties on a mud road and a rocky road surface, scratch resistance, and uniformity.

The performance evaluation tests were performed by mounting each of the pneumatic tires 1 having a tire size of LT265/70R17 121Q specified by JATMA on a JATMA standard rim wheel having a rim size of 17×8J, adjusting the air pressure to 350 kPa, mounting the tire on an evaluation vehicle (LT pickup vehicle), and then running the evaluation vehicle.

The evaluation method for each test item was as follows. Traveling properties on a mud road were measured by a sensory evaluation of traction and startability by a test driver. Traveling properties on a rocky road surface were measured by a sensory evaluation by a test driver of traction and startability on a rocky road surface formed of a predetermined rocky ground surface. The results of these evaluations are expressed as index values with Conventional Example being assigned the value of 100. Larger index values indicate superior off-road traveling properties. Scratch resistance was evaluated by measuring the number of damages to the sidewall portion 8 after traveling on a mud road or a rocky road surface. The results of these evaluations are expressed as index values with Conventional Example being assigned the value of 100. Larger index values indicate superior scratch resistance. Uniformity (vibration) was measured by a sensory evaluation by a test driver of the presence (magnitude) of vibration during traveling on a paved road surface (on-road surface). The results of this evaluation are expressed as index values with Conventional Example being assigned the value of 100. Larger index values indicate superior uniformity.

The performance evaluation tests were conducted on 31 kinds of pneumatic tires including the pneumatic tire of Conventional Example, which is an example of a conventional pneumatic tire, the pneumatic tires of Examples 1 to 17, which are the pneumatic tires 1 according to the embodiments of the present technology, and the pneumatic tires of Comparative Examples 1 to 14, which are related to the embodiments of the present technology.

The pneumatic tires according to Examples 1 to 17 and Comparative Examples 1 to 14 differ from each other in the land ratio R1, the outer circumference land ratio R2, and the inner circumference land ratio R3, which are specified with respect to the side block 40, the height of the side block 40, and the relationship between the vertical distance A of the side block 40 and the tire cross-sectional height SH. The results of the performance evaluation tests using these pneumatic tires indicate, as in FIGS. 7A to 7C, that the pneumatic tires 1 according to Examples 1 to 17 can improve off-road performance and scratch resistance while suppressing a decrease in tire uniformity, compared to Conventional Example and Comparative Examples 1 to 14. That is, the pneumatic tires 1 according to Examples 1 to 17 can provide off-road performance and scratch resistance in a compatible manner while suppressing a decrease in tire uniformity.

While the embodiments of the present technology have been described above, the present technology is not limited to the embodiments described above. For example, in the present embodiment, a pneumatic tire has been described as an example of a tire but is not limited to this, and the present embodiment can naturally be applied to a tire that is not filled with air, such as an airless tire. A gas to be filled in the pneumatic tire illustrated in the present embodiment may be an inert gas such as nitrogen, argon, and helium in addition to ordinary air or air with an adjusted oxygen partial pressure.

The invention claimed is:

1. A tire, comprising:
a tread portion extending in a tire circumferential direction; and
a pair of sidewall portions respectively disposed on both sides of the tread portion;
at least one of the pair of sidewall portions comprising a plurality of side blocks rising from a surface of the at least one of the sidewall portions and a plurality of side grooves defined by the side blocks adjacent to each other in the tire circumferential direction, one end of each of the plurality of side grooves opening to an inner side in a tire radial direction,
when a first imaginary line along a mold split position, which is a boundary between a tread mold forming the tread portion and a side mold forming the side blocks and the sidewall portions, and a second imaginary line along an individual end portion on the inner side of a plurality of the side blocks in the tire radial direction are defined, a land ratio R1 of a region defined by the first imaginary line and the second imaginary line to regions of the side blocks being in a range $40\% \leq R1 \leq 80\%$, wherein
the side blocks each include a recess portion in a substantially central portion in the tire circumferential direction and a shallow groove that is connected to the recess portion and is shallower than the recess portion, and the shallow groove extends to the inner side in the tire radial direction and opens to the side groove, and
a shoulder region of the tread portion includes a plurality of shoulder blocks arranged in the tire circumferential direction, and the side blocks are disposed straddling at least two of the shoulder blocks adjacent to each other in the tire circumferential direction.

2. The tire according to claim 1, wherein a third imaginary line along intermediate positions between the first imaginary line and the second imaginary line at a vertical distance in the tire radial direction is defined, and an outer circumference land ratio R2 of an outer circumferential region defined by the first imaginary line and the third imaginary line to regions of the side blocks in the outer circumferential region is in a range $65\% \leq R2 \leq 90\%$.

3. The tire according to claim 2, wherein a relationship between the outer circumference land ratio R2 and the land ratio R1 is in a range $1.1 \leq (R2/R1) \leq 1.7$.

4. The tire according to claim 3, wherein the side blocks have a projection amount of 3 mm or more and 10 mm or less from the surfaces of the sidewall portions.

5. The tire according to claim 4, wherein a relationship between a vertical distance A from the mold split position to the individual end portion on the inner side in the tire radial direction in the side blocks and a tire cross-sectional height SH is in a range $0.1 \leq (A/SH) \leq 0.4$.

6. The tire according to claim 2, wherein the third imaginary line along the intermediate positions between the first imaginary line and the second imaginary line at the vertical distance in the tire radial direction is defined, and an inner circumference land ratio R3 of an inner circumferential region defined by the second imaginary line and the third imaginary line to regions of the side blocks in the inner circumferential region is in a range $35\% \leq R3 \leq 70\%$.

7. The tire according to claim 6, wherein a relationship between the inner circumference land ratio R3 and the outer circumference land ratio R2 is in a range $0.5 \leq (R3/R2) \leq 0.8$.

8. The tire according to claim 1, wherein the third imaginary line along the intermediate positions between the first imaginary line and the second imaginary line at the vertical distance in the tire radial direction is defined, and an inner circumference land ratio R3 of an inner circumferential region defined by the second imaginary line and the third imaginary line to regions of the side blocks in the inner circumferential region is in a range $35\% \leq R3 \leq 70\%$.

9. The tire according to claim 8, wherein a relationship between the inner circumference land ratio R3 and the outer circumference land ratio R2 is in a range $0.5 \leq (R3/R2) \leq 0.8$.

10. The tire according to claim 1, wherein the side blocks have a projection amount of 3 mm or more and 10 mm or less from the surfaces of the sidewall portions.

11. The tire according to claim 1, wherein a relationship between a vertical distance A from the mold split position to the individual end portion on the inner side in the tire radial direction in the side blocks and a tire cross-sectional height SH is in a range $0.1 \leq (A/SH) \leq 0.4$.

\* \* \* \* \*